United States Patent [19]

Kallas

[11] Patent Number: 5,632,462
[45] Date of Patent: May 27, 1997

[54] COMPUTER MOUNT RETRACTABLE FOR POLICE VEHICLES

[76] Inventor: John J. Kallas, 400 Wildwood Dr., S. San Francisco, Calif. 94080

[21] Appl. No.: 588,399

[22] Filed: Jan. 18, 1996

[51] Int. Cl.⁶ ............................................ E04G 3/00
[52] U.S. Cl. ................... 248/286.1; 224/42.11; 248/922
[58] Field of Search ................... 248/286.1, 503, 248/183.1, 183.2, 920, 921, 922, 923, 187.1, 279.1; 224/929, 281, 42.11, 539, 554, 564, 571; 403/391, 389, 384, 396, 399

[56] References Cited

U.S. PATENT DOCUMENTS

| | | | |
|---|---|---|---|
| 2,779,642 | 1/1957 | Matthews | 248/922 X |
| 3,006,052 | 10/1961 | Stickney et al. | 248/187.1 |
| 3,356,325 | 12/1967 | Schnase | 248/187.1 |
| 3,964,612 | 6/1976 | Skilliter, Jr. et al. | 211/26 |
| 3,984,161 | 10/1976 | Johnson | 312/7 R |
| 4,547,092 | 10/1985 | Vetter et al. | 403/389 X |
| 4,579,473 | 4/1986 | Brugger | 248/922 X |
| 4,697,778 | 10/1987 | Harashima | 248/922 X |
| 4,854,538 | 8/1989 | Ven Schalscha | 224/929 X |
| 4,936,531 | 6/1990 | Banser | 224/42.11 |
| 4,979,709 | 12/1990 | Ishikawa | 248/187.1 |
| 5,025,780 | 6/1991 | Farley | 403/389 X |
| 5,190,346 | 3/1993 | Ringle | 403/391 X |
| 5,199,772 | 4/1993 | Jordan | 312/7.1 |
| 5,333,826 | 8/1994 | Lai | 403/389 X |
| 5,398,901 | 3/1995 | Brodmann et al. | 248/921 X |
| 5,429,332 | 7/1995 | Ishikawa | 248/187.1 |

*Primary Examiner*—Ramon O. Ramirez
*Attorney, Agent, or Firm*—Patent & Trademark Services; Joseph H. McGlynn

[57] ABSTRACT

A mounting assembly for a computer or other communications equipment within a vehicle, such as a police vehicle. A mounting bracket attached to the floor of the vehicle holds a pair of adjustable arms in a horizontal position with a piece of communication equipment on one end of the arms. At one end the arms are secured to the mounting bracket by an adjustable friction clamp, and at the other end the arms have an adjustable, rotatable clamp which allows the equipment to be positioned in order to make using the equipment more convenient.

6 Claims, 2 Drawing Sheets

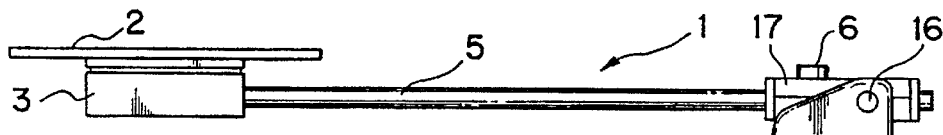
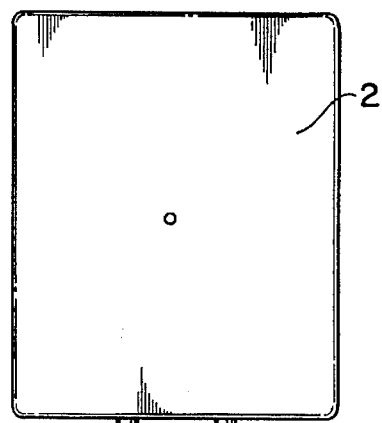
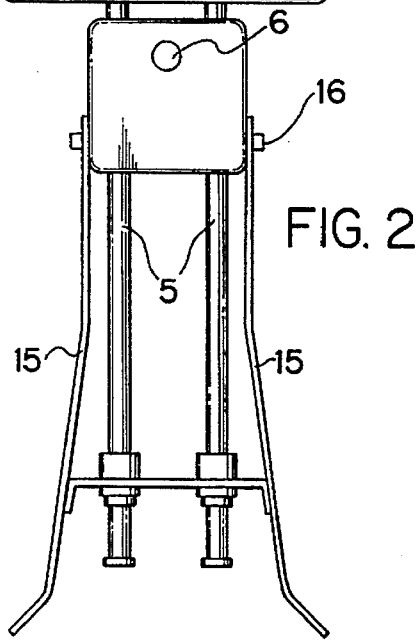
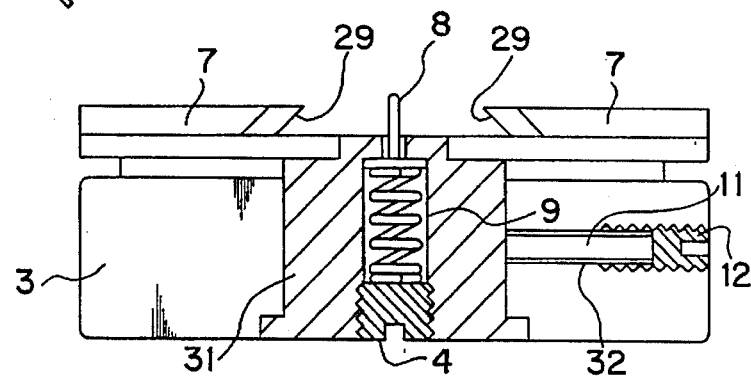

COMPUTER MOUNT RETRACTABLE FOR POLICE VEHICLES

BACKGROUND OF THE INVENTION

This invention relates, in general to mounts for computers in vehicles, and, in particular, to retractable mounts for police computers.

DESCRIPTION OF THE PRIOR ART

In the prior art various types of vehicle mounts have been proposed. For example, U.S. Pat. No. 3,964,612 discloses a communications equipment mount with an upright post with a deck attached to the upper end of the post. The deck includes a plurality of holder units which are vertically spaced to hold a plurality of equipment. U.S. Pat. No. 3,984,161 discloses a modular console for two-way radio equipment in a vehicle. The modular concept provides for installation convenience and easy access for repair or replacement. U.S. Pat. No. 4,936,531 discloses a multi-function mounting unit for a police radio bolted to the front floor of the passenger compartment to hold a long barreled gun, communication equipment, flashlight, and miscellaneous articles. U.S. Pat. No. 5,199,772 discloses a universal mounting system for mounting communication equipment in a vehicle which allows for upgrading or repositioning without changing the mounting hardware.

SUMMARY OF THE INVENTION

The present invention relates to a mounting assembly for a computer or other communications equipment within a vehicle, such as a police vehicle. A mounting bracket attached to the floor of the vehicle holds a pair of adjustable arms in a horizontal position with a piece of communication equipment on one end of the arms. At one end the arms are secured to the mounting bracket by an adjustable friction clamp, and at the other end the arms have an adjustable, rotatable clamp which allows the equipment to be positioned in order to make using the equipment more convenient.

It is an object of the present invention to provide a mounting assembly which makes using communication equipment in a vehicle more convenient.

It is an object of the present invention to provide a mounting assembly which is adjustable in a longitudinal direction.

It is an object of the present invention to provide a mounting assembly which is rotationally adjustable.

These and other objects and advantages of the present invention will be fully apparent from the following description, when taken in connection with the annexed drawings.

BRIEF DESCRIPTION OF THE DRAWINGS

FIG. 1 is a side view of the present invention.

FIG. 2 is a top view of the present invention.

FIG. 3 is a partial view of the rotational assembly of the present invention.

DESCRIPTION OF THE PREFERRED EMBODIMENT

Figure 4:
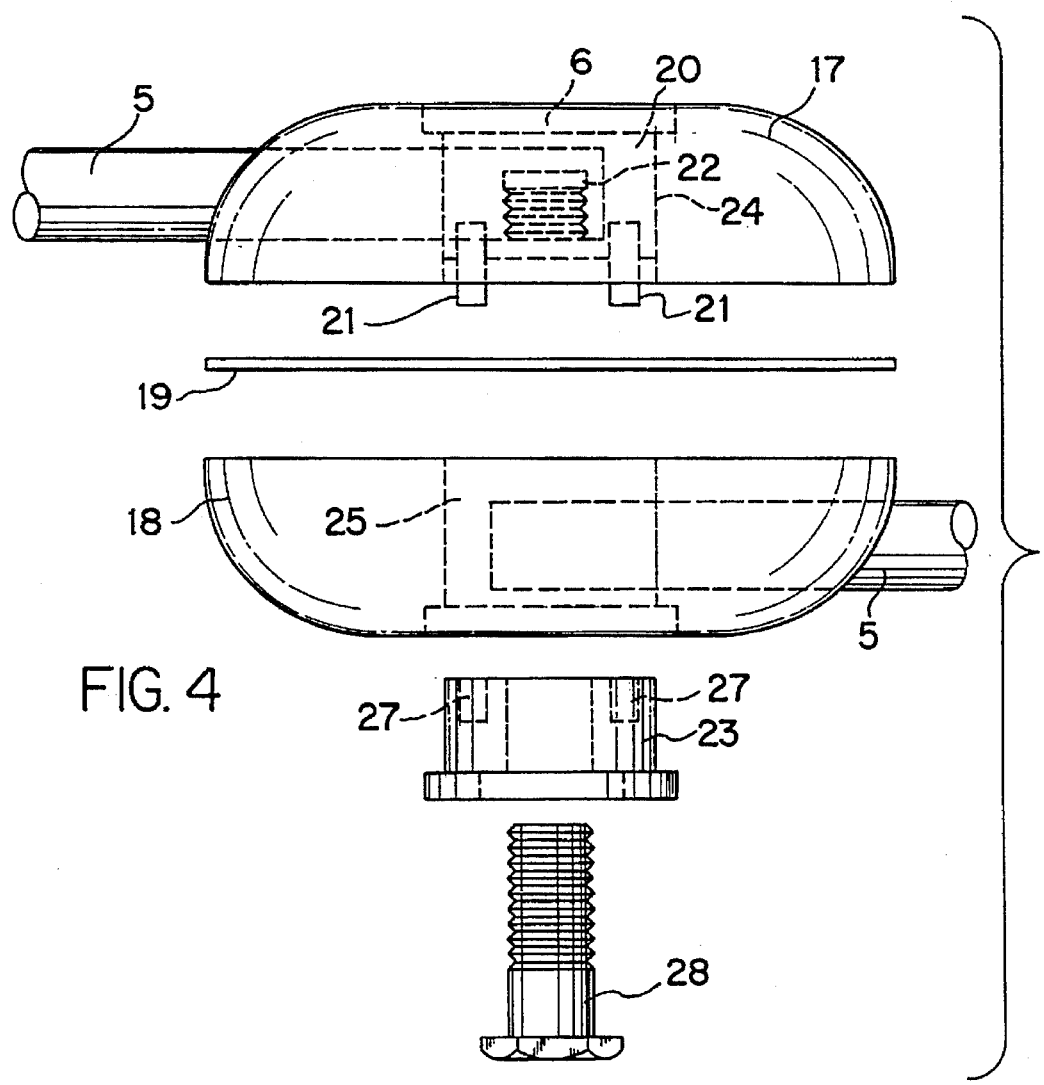
FIG. 4 is a partial view of the adjustable longitudinal assembly of the present invention.

Referring now to the drawings in greater detail, FIG. 1 shows in a side view the communication equipment holder 1 of the present invention. A pair of mounting flanges 15 secure the assembly to the transmission hump or other portion of the vehicle (not shown) by means of screws or bolts passing through apertures 26. At the other end of flanges 15 is a rod 16 which secures an adjustable clamping assembly (shown in FIG. 4) which maintains a pair of rods 5 in a set position.

The rods 5 are held between almost identical body parts 17 and 18 which can be shaped as hemispheres or, can assume some other shape. The hemispheres have central apertures 24 and 25, respectfully. Each aperture will accept a fastener part 20 and 23, respectfully, that will be approximately fully received in the apertures, and will be frictionally retained therein in order to fix the body parts with respect to the fastener parts. The fastener part 20 can be made as a separate piece and secured within the aperture 24, or it can be made unitary with the body part 17. The fastener part 20 has an internally threaded central aperture 22 which will receive a threaded bolt 28, that passes through fastener part 23 and threads into aperture 22. The fastener part 20 has plurality of pins 21 which project from one face and frictionally cooperate with apertures 27 in the part 23 to prevent the fastener parts from rotating with respect to each other.

Each fastener parts 20 and 23 have recesses (not shown) which will accept rods 5. The length of rods 5 projecting away from the mounting flanges 15 (as seen in FIG. 1) can be adjusted by loosening bolt 28, adjusting the rods 5 and then tightening the bolt 28 to hold the rods in the new position. The fastener parts 20 and 23 will frictionally retain the rods in the new position. A polyethylene washer 19 with a central aperture can be placed between the fastener parts 20 and 23 to help secure the rods.

Figure 5:
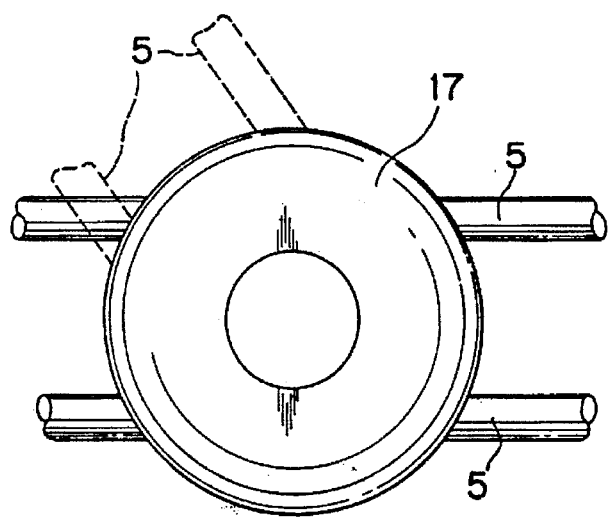
FIG. 5 is a partial view of the adjustable longitudinal assembly of the present invention shown in two positions.
Figure 6:
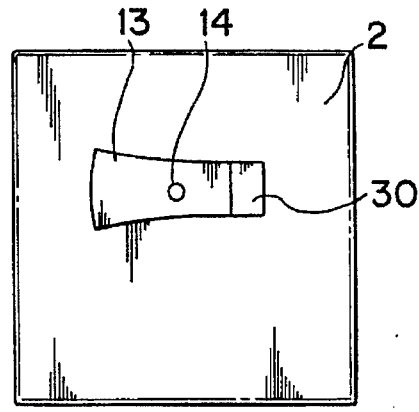
FIG. 6 is a bottom view of the plate for holding communication equipment of the present invention.

The fastener parts 20 and 23 can also be used, as shown in FIG. 5, to adjust the rods rotationally. Bolt 28 can be loosened to the point where the pins 21 are not engaged with apertures 27. The body parts 17 and 18 can be rotated to a new position, pins 21 can be engaged with apertures 27, and the bolt tightened to hold the rods in the new, rotated position.

At the opposite end of the rods, from flanges 15, a mounting plate 2 is attached for holding communication equipment such as, but not limited to, a computer. The rods 5 will be permanently secured to a block 3 by any conventional means. The block 3 will have a pair of flanges 7 attached to its top surface. The flanges will have tapered facing surfaces 29 which will receive a similarly tapered wedge 13 which is permanently attached to the bottom of plate 2. The wedge will have a central aperture 14 which will receive spring bullet catch 8. The wedge 2 will have a tapered leading end 30 which will push the bullet catch 8 down against the bias of spring 9 as the plate 2 is assembled with block 3.

To assemble the plate and the block 3 a user merely has to line up the wedge 13 with the space between flanges 7 and then slide the plate 2 toward the block 3 until the tapered leading end 30 engages the spring biased bullet catch 8. Continued sliding of the plate will cause the bullet catch 8 to be depressed until it reaches aperture 14 in wedge 13. When the bullet catch 8 is lined up with aperture 14 the spring 9 will push it into the aperture, thereby locking plate 2 and block 3 together.

Block 3 has a central aperture which rotationally receives a plug 31 in which spring biased bullet catch 8 is mounted.

The bullet catch 8 is secured within plug 31 by a set screw 4 which is threaded into an aperture in one face of the plug 31. When it is desired to remove plate 2 from block 3, the user merely pulls plate 2 away from block 3, which will cause the rounded end of the bullet catch 8 to ride up the edges of aperture 14, and then the wedge 13 on plate 2 can be removed from between flanges 7.

Block 3 also has means for rotating plate 2 so the plate can be adjusted to a more convenient position for the user. Block 3 has a bore 32 positioned on one side. A brake shoe 11 is placed in this bore and the position of the brake shoe within the bore can be controlled by a set screw 12 with external threads which engages an internal threaded portion of the bore. By loosening the set screw 12, the plug 31 can be rotated with respect to block 3 until the plate is in the desired position. Then set screw 12 can be tightened until brake shoe 11 is forced against the side of plug 31. This will prevent the block 3 and the plug 31 from rotating with respect to each other and the plate 2 will be locked into its new position.

Communication equipment may be secured to the plate 2 by any conventional means such as, but not limited to, VELCRO hook and loop type.

Although the communication equipment holder and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A communication equipment holder comprising:

means for securing said holder to the interior of a vehicle, a pair of rods secured to said means at one end by a clamping means for allowing an adjustment of the length of said rods and for allowing rotational adjustment of said rods with respect to said means for securing said holder to the interior of said vehicle, means at another end of said rods for supporting communication equipment on said rods, said means at another end of said rods including means for rotational adjustment of said communication equipment with respect to said rods.

2. The communication equipment holder as claimed in claim 1, wherein said clamping means comprises a pair of body parts secured to said means for securing said holder to the interior of a vehicle, said pair of body pads receiving said rods therebetween, threaded means for moving said pair of body parts toward and away from each other, whereby said rods will be frictionally clamped between said pair of body parts.

3. The communication equipment holder as claimed in claim 2, wherein said threaded means has a plurality of elements and one of said elements has a plurality of pins projecting therefrom, another of said elements has a plurality of recesses therein, said pins and recesses cooperating to prevent said pair of body parts from rotating with respect to each other.

4. The communication equipment holder as claimed in claim 1, wherein said means at another end of said rods for supporting communication equipment comprises a plate, said plate being detachably secured to a block affixed to said rods, said block containing means for allowing rotational adjustment of said plate with respect to said rods.

5. A communication equipment holder comprising:

means for securing said holder to the interior of a vehicle, a pair of rods secured to said means at one end by a clamping means for allowing an adjustment of the length of said rods and for allowing rotational adjustment of said rods with respect to said means for securing said holder to the interior of said vehicle, means at another end of said rods for supporting communication equipment on said rods, said means at another end of said rods including means for rotational adjustment of said communication equipment with respect to said rods said means at another end of said rods for supporting communication equipment comprises a plate, said plate being detachably secured to a block affixed to said rods, said block containing means for allowing rotational adjustment of said plate with respect to said rods, said means for allowing rotational adjustment of said plate with respect to said rods comprises a plug rotationally affixed to said block, said plug having a spring biased pin mounted therein, aperture means on said plate for receiving said spring biased pin, a wedge shaped opening on said block which receives a complimentary wedge on said plate, and means for locking said plug in position with respect to said block.

6. The communication equipment holder as claimed in claim 5, wherein said means for locking said plug in position with respect to said block comprises a passageway in said block extending from an external face of said block, said passageway having screw threads extending at least partially therealong, slidable means in said passageway for engaging said plug, screw means cooperating with said screw threads in said passageway to move said slidable means within said passageway, whereby when said slidable means engages said plug, said plug will not rotate with respect to said block.

* * * * *